(12) United States Patent
Senba

(10) Patent No.: US 8,369,440 B2
(45) Date of Patent: Feb. 5, 2013

(54) COMMUNICATION APPARATUS, COMMUNICATION METHOD, AND MOBILE STATION APPARATUS

(75) Inventor: Teruhiko Senba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 12/785,888

(22) Filed: May 24, 2010

(65) Prior Publication Data

US 2010/0296595 A1 Nov. 25, 2010

(30) Foreign Application Priority Data

May 25, 2009 (JP) ................................. 2009-125786

(51) Int. Cl.
*H04B 7/02* (2006.01)

(52) U.S. Cl. ........ 375/267; 375/144; 375/148; 375/347; 375/358; 375/295; 375/299; 375/260; 455/69; 455/67.11; 455/67.13; 455/63.1; 455/132; 455/500

(58) Field of Classification Search .................. 375/260, 375/267, 295, 347, 299, 144, 148, 358; 455/69, 455/67.11, 67.13, 63.1, 132, 500
See application file for complete search history.

(56) References Cited

U.S. PATENT DOCUMENTS

| 7,933,560 B2 * | 4/2011 | Han et al. ........................ 455/69 |
| 2007/0010209 A1 | 1/2007 | Nishizaki et al. |
| 2008/0056414 A1 | 3/2008 | Kim et al. |

FOREIGN PATENT DOCUMENTS

| JP | 2007-20047 | 1/2007 |
| JP | 2008-61253 | 3/2008 |

\* cited by examiner

*Primary Examiner* — Sam K Ahn
*Assistant Examiner* — Leila Malek
(74) *Attorney, Agent, or Firm* — Myers Wolin, LLC

(57) ABSTRACT

A communication apparatus includes a plurality of transmitting units that transmit a signal stream from each different antenna; a scheduling unit being configured such that the number of outputs is set so as to not exceed the number of transmitting units capable of transmitting, and a combination of transmitting units corresponding to the number of outputs, to each of which one of the signal streams is to be input, is defined in the form of a precoding matrix; a codeword generating unit that generates, from data to be transmitted, a predetermined number of codewords to be transmitted out simultaneously; an encoder that generates, from the codewords, signal streams corresponding to the number of outputs; and a modulation unit that supplies each of the signal streams to a corresponding one of the transmitting units in accordance with the precoding matrix.

5 Claims, 7 Drawing Sheets

| RANK | NUMBER OF STREAMS | |
|---|---|---|
| | CODEWORD 1 | CODEWORD 2 |
| 1 | 1 | 0 |
| 2 | 1 | 1 |
| 3 | 1 | 2 |
| 4 | 2 | 2 |

| CQI | MOD | TBS |
|---|---|---|
| 1 | QPSK | 16 |
| 2 | QPSK | 16 |
| 3 | QPSK | 24 |
| ⋮ | ⋮ | ⋮ |
| 16 | 16QAM | 344 |
| 17 | 16QAM | 376 |
| ⋮ | ⋮ | ⋮ |
| 29 | 64QAM | 728 |
| 30 | 64QAM | 728 |

FIG.5

| PRECODING VECTOR | Rank=1 | Rank=2 | Rank=3 | Rank=4 |
|---|---|---|---|---|
| 0 | $\begin{bmatrix}1&0&0&0\\0&0&0&0\\0&0&0&0\\0&0&0&0\end{bmatrix}$ | $\begin{bmatrix}1&0&0&0\\0&1&0&0\\0&0&0&0\\0&0&0&0\end{bmatrix}$ | $\begin{bmatrix}1&0&0&0\\0&1&0&0\\0&0&1&0\\0&0&0&0\end{bmatrix}$ | $\begin{bmatrix}1&0&0&0\\0&1&0&0\\0&0&1&0\\0&0&0&1\end{bmatrix}$ |
| 1 | $\begin{bmatrix}0&0&0&0\\1&0&0&0\\0&0&0&0\\0&0&0&0\end{bmatrix}$ | $\begin{bmatrix}1&0&0&0\\0&0&0&0\\0&1&0&0\\0&0&0&0\end{bmatrix}$ | $\begin{bmatrix}1&0&0&0\\0&1&0&0\\0&0&0&0\\0&0&1&0\end{bmatrix}$ | |
| 2 | $\begin{bmatrix}0&0&0&0\\0&0&0&0\\1&0&0&0\\0&0&0&0\end{bmatrix}$ | $\begin{bmatrix}1&0&0&0\\0&0&0&0\\0&0&0&0\\0&1&0&0\end{bmatrix}$ | $\begin{bmatrix}1&0&0&0\\0&0&0&0\\0&1&0&0\\0&0&1&0\end{bmatrix}$ | |
| 3 | $\begin{bmatrix}0&0&0&0\\0&0&0&0\\0&0&0&0\\1&0&0&0\end{bmatrix}$ | $\begin{bmatrix}0&0&0&0\\1&0&0&0\\0&1&0&0\\0&0&0&0\end{bmatrix}$ | $\begin{bmatrix}0&0&0&0\\1&0&0&0\\0&1&0&0\\0&0&1&0\end{bmatrix}$ | |
| 4 | | $\begin{bmatrix}0&0&0&0\\1&0&0&0\\0&0&0&0\\0&1&0&0\end{bmatrix}$ | | |
| 5 | | $\begin{bmatrix}0&0&0&0\\1&0&0&0\\0&0&0&0\\0&1&0&0\end{bmatrix}$ | | |

COMMUNICATION APPARATUS, COMMUNICATION METHOD, AND MOBILE STATION APPARATUS

CROSS-REFERENCE TO RELATED APPLICATION

This application is based upon and claims the benefit of priority of the prior Japanese Patent Application No. 2009-125786, filed on May 25, 2009, the entire contents of which are incorporated herein by reference.

FIELD

The embodiments discussed herein are related to a communication apparatus, a communication method, and a mobile station apparatus that transmits signals in parallel using a plurality of antennas.

BACKGROUND

There has long been a great need to enhance data transmission speed in wireless communications. To address this, work on next-generation data communication standards such as Long Term Evolution (LTE) has been proceeding. In high-speed data communication standards such as LTE, Multiple Input Multiple Output (MIMO) technology has been attracting attention since it can increase bandwidth in a simulated manner by using multiple antennas at both the transmitting and receiving ends for transmission and reception of signals. Among communication systems using MIMO technology, a closed-loop communication system is one in which information obtained at the receiving end is fed back to the transmitting end in order to achieve efficient data transmission in accordance with the communication environment or reception conditions. Based on the information received from the receiving end, the transmitting end determines the combination of antennas to be used for data transmission.

For example, in the multiple antenna system disclosed in Japanese Laid-Open Patent Publication No. 2008-61253, the receiving apparatus generates feedback information and transmits the feedback information to the transmitting apparatus. The feedback information is generated based on maximum channel quality, an antenna group index associated with the maximum channel quality, rank information, and remaining channel quality information associated with the rank information. On the other hand, the transmitting apparatus selects either multiple user mode or single user mode, based on the feedback information received from the receiving apparatus. Then, the transmitting apparatus transmits via a plurality of antenna groups or a single antenna group the user data streams selected in accordance with the selected transmission mode.

On the other hand, in the communication system disclosed in Japanese Laid-Open Patent Publication No. 2007-20047, when the receiving apparatus detects a state change from normal to abnormal or from abnormal to normal in any one of its receiving channels, the receiving apparatus calculates the number of transmitting channels for the transmitting apparatus so that the number of transmitting channels does not exceed the number of normally operating receiving channels. Then, the receiving apparatus transmits transmitting-channel information indicating the thus calculated number of transmitting channels to the transmitting apparatus. When the transmitting-channel information is received, the transmitting apparatus adjusts the number of operable transmitting channels so that it matches the number indicated by the transmitting-channel information.

SUMMARY

According to one embodiment, there is provided a communication apparatus. The communication apparatus includes: a plurality of transmitting units, each of which is connected to a different antenna and transmits a signal stream via the antenna; a scheduling unit which is configured such that when the number of receiving units capable of simultaneously receiving, the number being included in feedback information received from a receiving apparatus having a plurality of receiving units respectively connected to different antennas, is larger than the number of transmitting units detected from among the plurality of transmitting units as being capable of transmitting, the number of outputs indicating the number of transmitting units to be used to transmit signal streams is set so as not to exceed the number of transmitting units capable of transmitting, and a combination of transmitting units corresponding to the number of outputs, to each of which one of the signal streams is to be input, is defined in the form of a precoding matrix; a codeword generating unit that generates, from data to be transmitted, a predetermined number of codewords to be transmitted out simultaneously; an encoder that generates signal streams corresponding to the number of outputs by splitting the predetermined number of codewords; and a modulation unit that supplies each of the signal streams generated by the encoder to a corresponding one of the transmitting units in accordance with the precoding matrix.

According to another embodiment, there is provided a mobile station apparatus which includes: a baseband processing unit that encodes an uplink signal; and a plurality of communication units, respectively connected to different antennas, that transmit the uplink signal encoded by the baseband processing unit to a base station apparatus having a plurality of receiving units respectively connected to different antennas. The baseband processing unit includes: a scheduling unit which is configured such that when the number of receiving units capable of simultaneously receiving, the number being included in feedback information received from the base station apparatus, is larger than the number of communication units detected from among the plurality of communication units as being capable of transmitting, the number of outputs indicating the number of communication units to be used to transmit signal streams is set so as not to exceed the number of communication units capable of transmitting, and a combination of communication units corresponding to the number of outputs, to each of which one of the signal streams is to be input, is defined in the form of a precoding matrix; a codeword generating unit that generates, from the uplink signal, a predetermined number of codewords to be transmitted out simultaneously; an encoder that encodes the predetermined number of codewords, and generates signal streams corresponding to the number of outputs by splitting the encoded codewords; and a modulation unit that supplies each of the signal streams generated by the encoder to a corresponding one of the communication units in accordance with the precoding matrix.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating one example of a precoding table.

DESCRIPTION OF EMBODIMENTS

In a communication system using MIMO technology according to the prior art, a transmitting apparatus transmits data on a codeword-by-codeword basis. The transmitting apparatus may split one or a plurality of codewords to be transmitted simultaneously into streams for transmission via different antennas. In this case, if any one of the plurality of receivers in the transmitting apparatus fails, the stream to be transmitted from that failed transmitter may not be transmitted to the receiving apparatus. On the other hand, a receiving apparatus calculates the channel quality indicator (CQI) value on a codeword-by-codeword basis. Then, the receiving apparatus feeds back the CQI value calculated on a codeword-by-codeword basis to the transmitting apparatus. As a result, the transmitting apparatus erroneously determines that the transmission characteristic of the normally operating transmitter transmitting the stream to be paired with the stream that was supposed to be transmitted from the failed transmitter is also not good. Since the transmitting apparatus controls scheduling so as to not use any transmitter whose transmission characteristic is not good, the normally operating transmitter transmitting the stream to be paired with the stream that was supposed to be transmitted from the failed transmitter is also deselected. This needlessly degrades the communication efficiency.

On the other hand, a communication system according to one embodiment uses MIMO technology, in which a transmitting apparatus having a plurality of transmitting units respectively connected to different antennas transmits signal streams in parallel to a receiving apparatus having a plurality of receiving units respectively connected to different antennas. In this communication system, the transmitting apparatus refers to feedback information from the receiving apparatus and determines an optimum combination of transmitting units for transmission of the signal streams by excluding any failed transmitting unit, and generates the signal streams so as to match the thus determined combination, thereby preventing the communication efficiency from dropping needlessly.

The communication system according to one embodiment will be described below with reference to the drawings.

Figure 1:
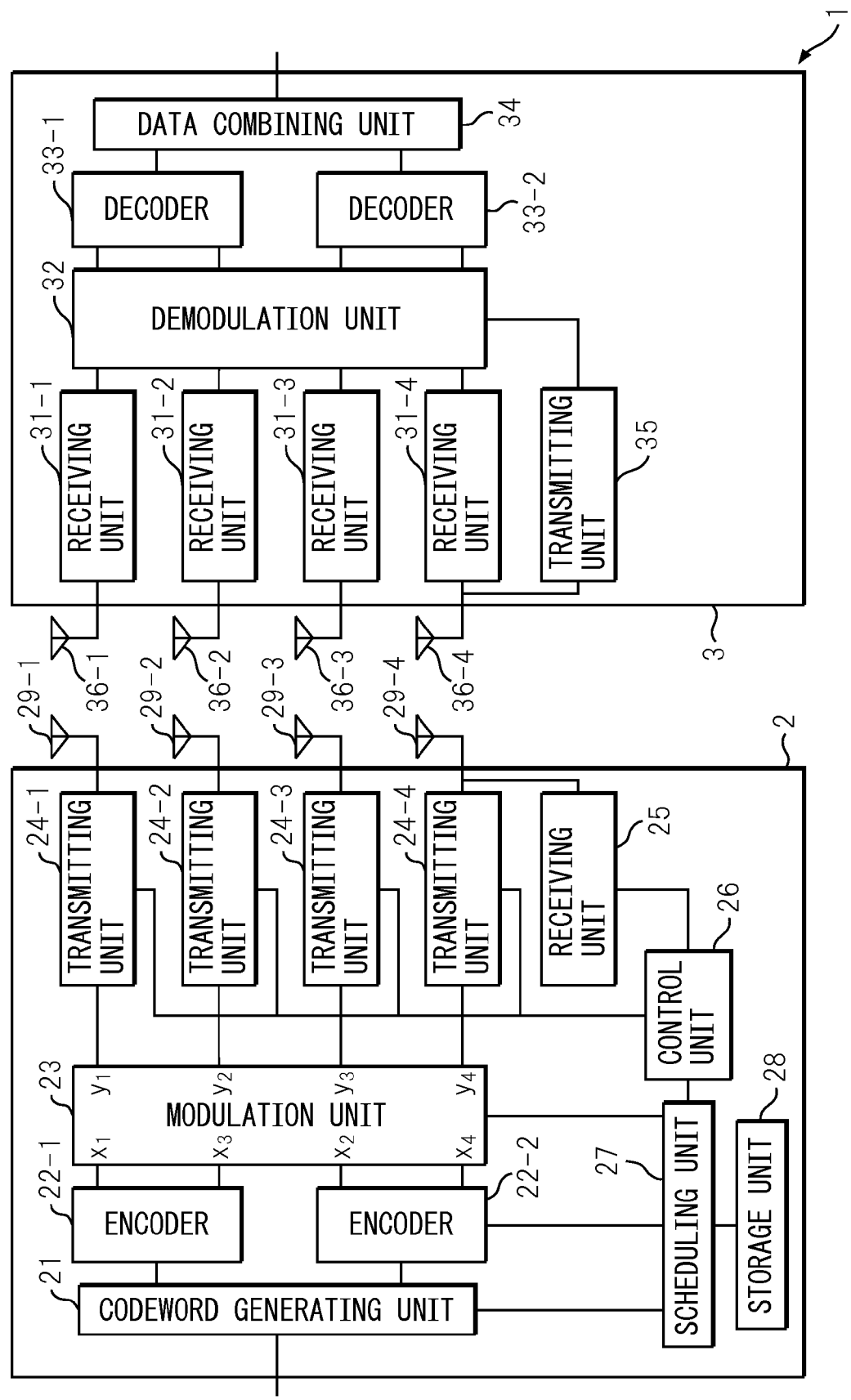
FIG. 1 is a diagram schematically illustrating the configuration of a communication system according to one embodiment.

FIG. 1 is a diagram schematically illustrating the configuration of a communication system 1 according to one embodiment. The communication system 1 includes a transmitting apparatus 2 and a receiving apparatus 3. The transmitting apparatus 2 includes a codeword generating unit 21, two encoders 22-1 and 22-2, a modulation unit 23, four transmitting units 24-1 to 24-4, a receiving unit 25, a control unit 26, a scheduling unit 27, and a storage unit 28. On the other hand, the receiving apparatus 3 includes four receiving units 31-1 to 31-4, a demodulation unit 32, two decoders 33-1 and 33-2, a data combining unit 34, and a transmitting unit 35. The above units in the transmitting apparatus 2 may be provided as separate circuits or may be implemented together on a single integrated circuit for mounting in the transmitting apparatus 2. Similarly, the above units in the receiving apparatus 3 may be provided as separate circuits or may be implemented together on a single integrated circuit for mounting in the receiving apparatus 3. In the present embodiment, the number of transmitting units provided in the transmitting apparatus 2 is only illustrative, and may be set to any number not smaller than 2 but not larger than the number that can be physically mounted in the transmitting apparatus 2. Similarly, the number of receiving units provided in the receiving apparatus 3 is only illustrative, and may be set to any number not smaller than 2 but not larger than the number that can be physically mounted in the receiving apparatus 3. Further, the number of transmitting units provided in the transmitting apparatus 2 may be made different from the number of receiving units provided in the receiving apparatus 3.

The Transmitting Apparatus 2 will be Described Below.

The codeword generating unit 21 splits transmit data into codewords each having a length defined by the transport block size (TBS) determined by the scheduling unit 27. The codeword is, for example, MAC-PDU data that conforms to the media access control (MAC) layer and the protocol data unit (PDU) layer. The codeword generating unit 21 assigns the generated codewords to the respective encoders 22-1 and 22-2 by referring to the number of streams determined by the scheduling unit 27 for each of the codewords to be encoded by the encoders 22-1 and 22-2. The number of streams represents the number of data to be transmitted simultaneously for one codeword. Accordingly, when the number of streams for a particular codeword is a positive number, that particular codeword is transmitted by being split into streams in accordance with the number of streams corresponding to it. On the other hand, when the number of streams for a particular codeword is 0, that particular codeword is not used.

Therefore, as long as the number of streams is not zero for both the codeword to be encoded by the encoder 22-1 and the codeword to be encoded by the encoder 22-2, the codeword generating unit 21 passes the generated codewords to the respective encoders 22-1 and 22-2. On the other hand, if the number of streams is zero for the codeword to be encoded by the encoder 22-1, the codeword generating unit 21 passes all the generated codewords to the encoder 22-2. Conversely, if the number of streams is zero for the codeword to be encoded by the encoder 22-2, the codeword generating unit 21 passes all the generated codewords to the encoder 22-1.

The encoders 22-1 and 22-2 apply error correction coding, such as convolutional coding or Turbo coding, to the codewords received from the codeword generating unit 21. Further, the encoders 22-1 and 22-2 each generate streams by splitting the encoded codeword in accordance with the number of streams acquired from the scheduling unit 27. In the present embodiment, since the transmitting apparatus 2 has four transmitting units, each encoder splits the codeword into a maximum of two streams. Then, the encoders 22-1 and 22-2 supply the encoded codewords on a stream-by-stream basis to the modulation unit 23.

The modulation unit 23 quadrature-modulates the streams received from the encoders 22-1 and 22-2 in accordance with the modulation mode MOD determined by the scheduling unit 27.

The modulation unit 23 supplies each stream to a corresponding one of the transmitting units 24-1 to 24-4 in accordance with the precoding matrix determined by the scheduling unit 27.

For example, the relationship between each stream and the transmitting unit to which the stream is supplied is defined using a precoding vector T as illustrated below.

$$\begin{bmatrix} y_1 \\ y_2 \\ y_3 \\ y_4 \end{bmatrix} = T \begin{bmatrix} x_1 \\ x_2 \\ x_3 \\ x_4 \end{bmatrix} = \begin{bmatrix} t_{11} & t_{21} & t_{31} & t_{41} \\ t_{12} & t_{22} & t_{32} & t_{42} \\ t_{13} & t_{23} & t_{33} & t_{43} \\ t_{14} & t_{24} & t_{34} & t_{44} \end{bmatrix} \begin{bmatrix} x_1 \\ x_2 \\ x_3 \\ x_4 \end{bmatrix} \qquad (1)$$

Here, $x_1$ and $x_3$ correspond to the two streams supplied from the encoder 22-1, and $x_2$ and $x_4$ correspond to the two streams supplied from the encoder 22-2. Further, $y_1$ to $y_4$ correspond to the respective transmitting units 24-1 to 24-4. Each element $t_{ij}$ ($1 \leq i, j \leq 4$) of the precoding vector T is either 0 or 1. For example, suppose that only the streams $x_1$ and $x_2$ are transmitted ($x_3 = x_4 = 0$) and that the elements $t_{ij}$ of the precoding vector T have the following values.

$$\begin{pmatrix} 1 & 0 & 0 & 0 \\ 0 & 0 & 0 & 0 \\ 0 & 1 & 0 & 0 \\ 0 & 0 & 0 & 0 \end{pmatrix}$$

Then, in equation (1), $y_1 = x_1$, $y_3 = x_2$, and $y_2 = y_4 = 0$. Accordingly, the modulation unit 23 supplies the stream $x_1$ generated by the encoder 22-1 to the transmitting unit 24-1 and supplies the stream $x_2$ generated by the encoder 22-2 to the transmitting unit 24-3. The modulation unit 23 does not supply streams to the transmitting units 24-2 and 24-4.

The transmitting units 24-1 to 24-4 each generate a radio signal by superimposing the stream supplied from the modulation unit 23 onto a carrier wave having a radio frequency. Each of the transmitting units 24-1 to 24-4 has a high-power amplifier. Each of the transmitting units 24-1 to 24-4 thus amplifies the strength of the radio signal to a desired level. The transmitting units 24-1 to 24-4 are connected to antennas 29-1 to 29-4, respectively, and transmit the radio signals via the respective antennas.

The transmitting units 24-1 to 24-4 each have a self-diagnostic function, and detect any fault that can interfere with the radio signal transmission by diagnosing the high-power amplifiers of the transmitting units 24-1 to 24-4 and the antennas 29-1 to 29-4 connected to the respective transmitting units 24-1 to 24-4. If any fault that can interfere with the radio signal transmission is detected, the corresponding one of the transmitting units 24-1 to 24-4 outputs transmitter operating state information indicating to the control unit 26 that the transmitting unit is faulty; otherwise, the transmitting units 24-1 to 24-4 each output transmitter operating state information indicating to the control unit 26 that the transmitting unit is operating normally.

The receiving unit 25 is connected to the antenna 29-4 via a duplexer (not illustrated) provided between the antenna 29-4 and the transmitting unit 24-4, and receives via the antenna 29-4 a radio signal transmitted from the receiving apparatus 3. The receiving unit 25 has a low-noise amplifier which amplifiers the received radio signal. Then, the receiving unit 25 generates an intermediate frequency signal by multiplying the amplified radio signal with a local oscillator signal, and supplies the intermediate frequency signal to the control unit 26.

The control unit 26 controls the entire operation of the transmitting apparatus 2. Further, the control unit 26 acquires from each of the transmitting units 24-1 to 24-4 the transmitter operating state information indicating whether the transmitting unit is operating normally or is faulty and unable to transmit the signal. Then, the control unit 26 sends transmitter fault information to the scheduling unit 27 to indicate the number of transmitting units capable of transmitting and the number of transmitting units not capable of transmitting. Instead of sending the information indicating the number of transmitting units not capable of transmitting, the control unit 26 may send the scheduling unit 27 the information indicating the number of transmitting units capable of transmitting.

Furthermore, the control unit 26 demodulates and decodes the signal received from the receiving unit 25, and extracts feedback information from the decoded signal. The feedback information includes the CQI value calculated for each codeword, the rank value corresponding to the number of receiving units in the receiving apparatus that are capable of simultaneously receiving, and the precoding vector recommending a combination of transmitting units corresponding to the channels of good communication quality. The control unit 26 passes the feedback information to the scheduling unit 27.

By referring to the transmitter fault information and feedback information, the scheduling unit 27 determines the codeword length, the modulation mode, the number of streams for each codeword, and the transmitting units to be used to transmit the streams.

Figure 2:
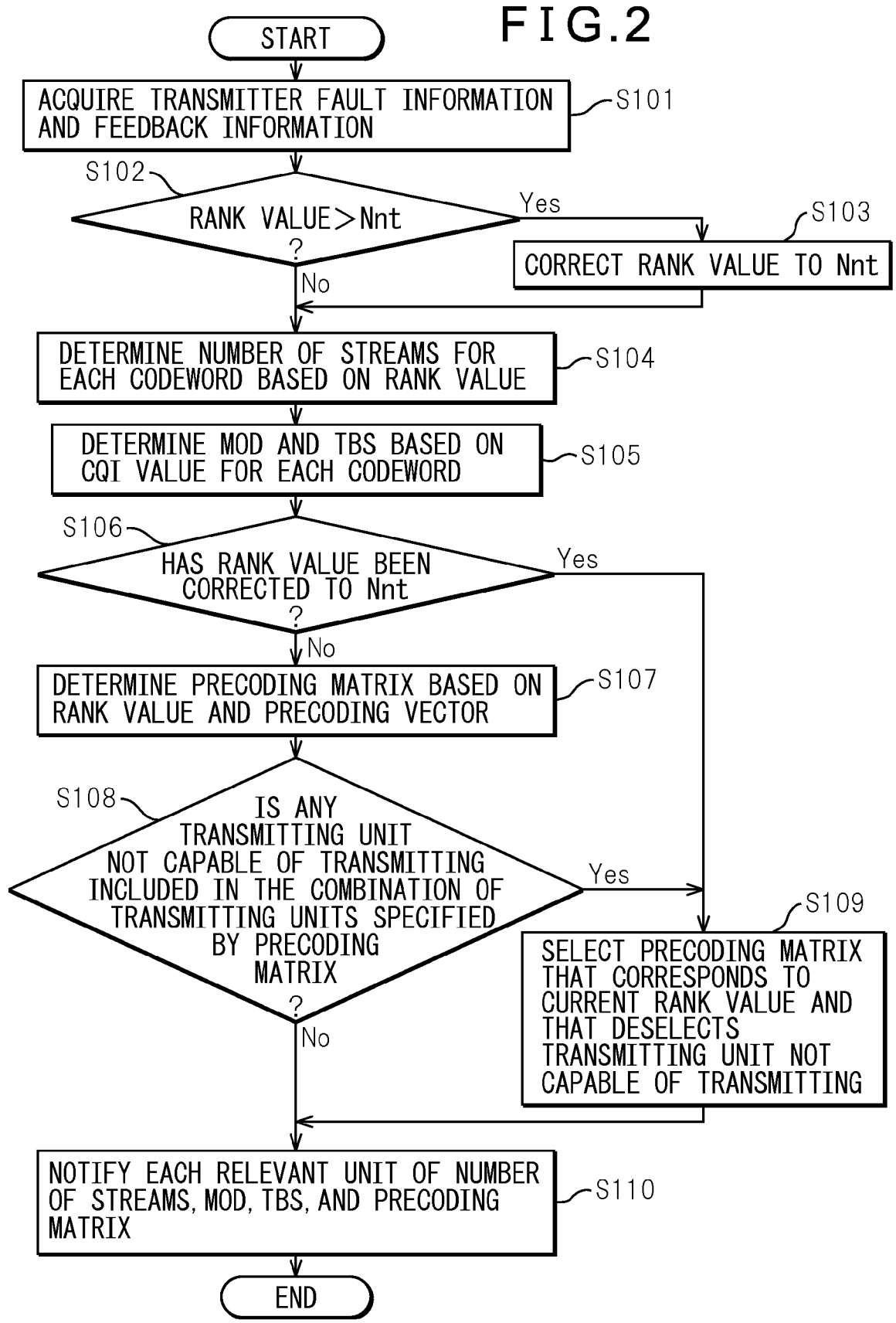
FIG. 2 is an operation flowchart illustrating a scheduling process performed by a scheduling unit.

FIG. 2 is an operation flowchart illustrating the scheduling process performed by the scheduling unit 27. The scheduling unit 27 performs the following scheduling process at regular intervals of time while the transmitting apparatus 2 is communicating with the receiving apparatus 3.

First, the scheduling unit 27 acquires the transmitter fault information and feedback information from the control unit 26 (step S101). Next, the scheduling unit 27 determines whether the rank value included in the feedback information is larger than the number Nnt indicated by the transmitter fault information as the number of transmitting units capable of transmitting (step S102). If the rank value is larger than Nnt (Yes in step S102), the scheduling unit 27 corrects the rank value to Nnt (step S103). In step S103, the scheduling unit 27 may set the rank value to a value smaller than Nnt.

If the rank value is not larger than Nnt in step S102 (No in step S102), or after carrying out step S103, the scheduling unit 27 determines the number of streams for each codeword, based on the rank value included in the feedback information (step S104). In this case, the scheduling unit 27 refers to a stream table indicating the relationship between the rank value and the number of streams for each codeword, and identifies the number of streams for each codeword corresponding to the rank value included in the feedback information.

Figure 3:
FIG. 3 is a diagram illustrating one example of a stream table.

FIG. 3 illustrates one example of the stream table. As illustrated in FIG. 3, in the stream table 300, each entry in the leftmost column indicates the rank value. Each entry in the center column indicates the number of streams for the first codeword to be encoded by the encoder 22-1. Each entry in the rightmost column indicates the number of streams for the second codeword to be encoded by the encoder 22-2. In each row of the stream table 300, the rank value is associated with the number of streams for each codeword.

For example, when the rank value is 1, the scheduling unit 27 sets the number of streams to 1 for the first codeword and to 0 for the second codeword. On the other hand, when the rank value is 4, the scheduling unit 27 sets the number of streams to 2 for both the first and second codewords.

Next, based on the CQI value for each codeword included in the feedback information, the scheduling unit 27 determines the modulation mode MOD and the transport block size TBS indicating the codeword length for each codeword (step S105). The scheduling unit 27 refers to a mode table indicating the relationship between the CQI value and the MOD and TBS for each codeword, and identifies the MOD and TBS corresponding to the CQI value included in the feedback information.

Figure 4:
FIG. 4 is a diagram illustrating one example of a mode table.

FIG. 4 illustrates one example of the mode table. As illustrated in FIG. 4, in the mode table 400, each entry in the leftmost column indicates the CQI value. Each entry in the center column indicates the type of modulation mode MOD to be used. Each entry in the rightmost column indicates the transport block size TBS. In each row of the mode table 400, the CQI value is associated with the MOD and TBS.

For example, when the CQI value is 1, the scheduling unit 27 sets the MOD to quadrature phase-shift keying (QPSK) and the TBS to 16. On the other hand, when the CQI value is 16, the scheduling unit 27 sets the MOD to 16 quadrature amplitude modulation (16 QAM) and the TBS to 344.

The scheduling unit 27 determines whether the rank value has been corrected in step S103 to Nnt that indicates the number of transmitting units capable of transmitting (step S106). If the rank value has not been corrected (No in step S106), the precoding matrix that indicates the streams to be transmitted and the combination of transmitting units to be used to transmit the streams is determined based on the rank value and precoding vector included in the feedback information (step S107). The scheduling unit 27 refers to a precoding table indicating the relationship between the rank value and precoding vector and the precoding matrix, and identifies the precoding matrix corresponding to the rank value and precoding vector included in the feedback information.

FIG. 5 illustrates one example of the precoding table. As illustrated in FIG. 5, in the precoding table 500, each entry in the leftmost column indicates the precoding vector value. Each entry in the uppermost row indicates the rank value. Each of the other entries indicates the precoding matrix corresponding to the precoding vector value and the rank value indicated in the row and column to which the entry belongs.

For example, when the precoding vector value is 1, and the rank value is 2, the scheduling unit 27 sets the precoding matrix to use as follows.

$$\begin{pmatrix} 1 & 0 & 0 & 0 \\ 0 & 0 & 0 & 0 \\ 0 & 1 & 0 & 0 \\ 0 & 0 & 0 & 0 \end{pmatrix}$$

In this case, the transmitting units 24-1 and 24-3 are used.

However, one of the transmitting units specified to be used for the transmission of the streams by the precoding matrix identified by the rank value and precoding vector included in the feedback information may happen to be one indicated in the transmitter fault information as being a transmitting unit not capable of transmitting. In view of this, the scheduling unit 27 determines whether any transmitting unit indicated in the transmitter fault information as being a transmitting unit not capable of transmitting is included in the combination of transmitting units specified by the precoding matrix identified in step S107 (step S108). If any transmitting unit not capable of transmitting is included (Yes in step S108), the scheduling unit 27 selects another precoding matrix that corresponds to the current rank value and that deselects the transmitting unit not capable of transmitting (step S109).

On the other hand, if it is determined in step S106 that the rank value has been corrected (Yes in step S106), the scheduling unit 27 cannot use the precoding vector included in the feedback information in order to determine the precoding matrix. Therefore, in this case also, the scheduling unit 27 proceeds to carry out step S109.

If it is determined in step S108 that the combination does not include any transmitting unit not capable of transmitting (No in step S108), or after carrying out step S109, the scheduling unit 27 notifies each relevant unit in the transmitting apparatus 2 of the number of streams, MOD, and TBS for each codeword and the precoding matrix (step S110). More specifically, the scheduling unit 27 notifies the codeword generating unit 21 of the number of streams and TBS for each codeword. The scheduling unit 27 notifies the encoders 22-1 and 22-2 of the number of streams for each codeword. Further, the scheduling unit 27 notifies the modulation unit 23 of the MOD and the precoding matrix to be used.

After that, the scheduling unit 27 terminates the scheduling process.

The storage unit 28 includes, for example, a volatile semiconductor memory and a nonvolatile semiconductor memory. The storage unit 28 stores the precoding matrix, precoding table, stream table, mode table, and various other pieces of information. These pieces of information are read out of the storage unit 28 during power-up of the transmitting apparatus 2 or at the request of the scheduling unit 27.

Figure 6:
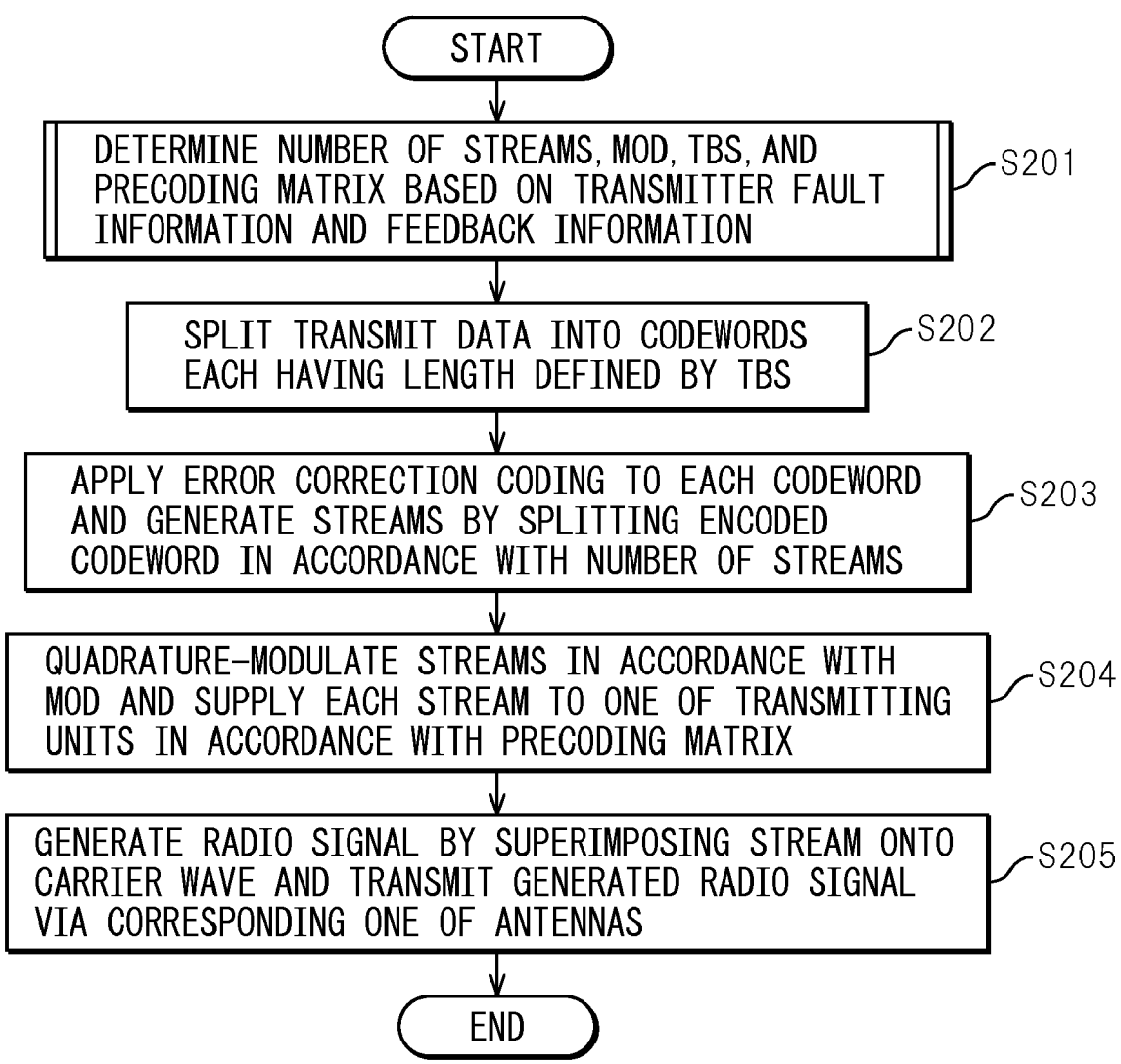
FIG. 6 is an operation flowchart illustrating a data transmission process performed by a transmitting apparatus.

FIG. 6 is an operation flowchart illustrating the data transmission process performed by the transmitting apparatus 2.

As illustrated in FIG. 6, the scheduling unit 27 determines the number of streams, MOD, and TBS for each codeword and the precoding matrix, based on the transmitter fault information and feedback information (step S201). Then, the scheduling unit 27 notifies each relevant unit in the transmitting apparatus 2 of the number of streams, MOD, and TBS for each codeword and the precoding matrix.

Next, the codeword generating unit 21 splits transmit data into codewords each having a length defined by the transport block size TBS determined by the scheduling unit 27 (step S202). The codeword generating unit 21 passes the codewords to the respective encoders 22-1 and 22-2.

The encoders 22-1 and 22-2 apply error correction coding to the codewords received from the codeword generating unit 21. Further, the encoders 22-1 and 22-2 each generate streams by splitting the encoded codeword in accordance with the number of streams acquired from the scheduling unit 27 (step S203). Then, the encoders 22-1 and 22-2 supply the encoded codewords on a stream-by-stream basis to the modulation unit 23.

The modulation unit 23 quadrature-modulates the streams received from the encoders 22-1 and 22-2 in accordance with the modulation mode MOD determined by the scheduling unit 27. The modulation unit 23 supplies each stream to a corresponding one of the transmitting units 24-1 to 24-4 in accordance with the precoding matrix determined by the scheduling unit 27 (step S204).

The transmitting units 24-1 to 24-4 each generate a radio signal by superimposing the stream supplied from the modulation unit 23 onto a carrier wave having a radio frequency. The transmitting units 24-1 to 24-4 transmit the radio signals via the respective antennas 29-1 to 29-4 (step S205).

Next, the Receiving Apparatus 3 will be Described.

The receiving units 31-1 to 31-4 are connected to antennas 36-1 to 36-4, respectively. The receiving units 31-1 to 31-4 receive via the respective antennas 36-1 to 36-4 the radio signals transmitted from the antennas 29-1 to 29-4 of the transmitting apparatus 2.

Each of the receiving units 31-1 to 31-4 has a low-noise amplifier which amplifies the received radio signal. Each of the receiving units 31-1 to 31-4 supplies the amplified radio signal to the demodulation unit 32.

The demodulation unit 32 performs channel estimation on the radio signals received from the receiving units 31-1 to 31-4, and demultiplexes the signals transmitted out from the respective antennas of the transmitting apparatus 2. The demodulation unit 32 can demultiplex the signals using a suitable signal demultiplexing method such as Minimum Mean Square Error (MMSE), Successive Interference Cancellation (SIC), or Maximum Likelihood Detection (MLD). Then, the demodulation unit 32 demodulates the demultiplexed signals and passes the demodulated signals to the decoders 33-1 and 33-2.

Further, the demodulation unit 32 calculates the feedback information, such as CQI value, rank value, and precoding vector, to be fed back to the transmitting apparatus 2.

For example, the demodulation unit 32 calculates the value of reception quality for each codeword for the case where the precoding matrix determined by each settable rank value and precoding vector is applied. The value indicating the reception quality may be any one of reception quality values selected, for example, from among Signal to Interference power Ratio (SIR), Signal to Noise power Ratio (SNR), Carrier to Noise power Ratio (CNR), and Carrier to Interference power Ratio (CIR). The demodulation unit 32 can calculate the SIR, SNR, CNR, or CIR by measuring the intensity of the pilot signal contained in the received radio signal.

Next, the demodulation unit 32 determines the CQI value from the thus calculated reception quality value. For example, the CQI value takes any value between 1 and 30, and the better the reception quality, the higher the value. The value range that the reception quality value can take is divided into 30 equal subranges, and the demodulation unit 32 determines the CQI value for each codeword by determining to which subrange the reception quality value belongs.

For each precoding matrix, the demodulation unit 32 determines the CQI value for each codeword for the case where the modulation method and transport block size selected by the transmitting apparatus 2 are applied. Then, the demodulation unit 32 selects the combination of the rank value and precoding vector that maximizes the sum of the CQI values. The demodulation unit 32 then generates the feedback information by including therein the selected combination of the rank value and precoding vector and the CQI values associated with that combination. The method for determining the CQI value, rank value, and precoding vector to be included in the feedback information is disclosed, for example, by Ofuji et al. in "Experimental results on 4x4 MIMO precoding in E-UTRA," The 14th Asia-Pacific Conference on Communications (APCC), October 2008.

The demodulation unit 32 supplies the feedback information to the transmitting unit 35.

The decoders 33-1 and 33-2 each reconstruct the encoded codeword by combining the streams received from the demodulation unit 32. Then, the decoders 33-1 and 33-2 apply error correction decoding to the encoded codewords. The decoders 33-1 and 33-2 supply the decoded codewords to the data combining unit 34.

The data combining unit 34 combines the codewords received from the decoders 33-1 and 33-2 and thus reconstructs the original data. The data combining unit 34 supplies the reconstructed original data to other component elements of the receiving apparatus 3.

The transmitting unit 35 quadrature-modulates the feedback-information carrying signal supplied from the demodulation unit 32, and generates a radio signal by superimposing the feedback-information carrying signal onto a carrier wave having a radio frequency. The transmitting unit 35 has a high-power amplifier. The transmitting unit 35 thus amplifies the strength of the radio signal to a desired level. The transmitting unit 35 is connected to the antenna 36-4 via a duplexer (not illustrated) provided between the antenna 36-4 and the receiving unit 31-4. The transmitting unit 35 radiates the feedback-information carrying radio signal from the antenna 36-4.

As described above, in the communication system disclosed herein, the transmitting apparatus having a plurality of transmitting units respectively connected to different antennas transmits signal streams in parallel to the receiving apparatus having a plurality of receiving units respectively connected to different antennas. Specifically, in this communication system, if any one of the transmitting units is faulty, and if the number of transmitting units capable of transmitting is smaller than the rank value fed back from the receiving apparatus, then the transmitting apparatus determines the precoding matrix according to the number of transmitting units capable of transmitting so that any faulty transmitting unit will not be used. Further, the transmitting apparatus generates the signal streams to be transmitted simultaneously, so as to match the number of transmitting units capable of transmitting. In this way, the communication system can make maximum effective use of the available transmitting units, thus serving to prevent the communication efficiency from dropping needlessly.

For example, by combining the component elements of the transmitting apparatus 2 with the component elements of the receiving apparatus 3, a communication apparatus can be constructed that can both transmit and receive signals by using MIMO technology. In this case, the antennas 29-1 to 29-4 of the transmitting apparatus 2 and the antennas 36-1 to 36-4 of the receiving apparatus 3 are replaced by a set of common antennas. Each of the common antennas is connected via a duplexer to one of the transmitting units 24-1 to 24-4 in the transmitting apparatus 2 and one of the receiving units 36-1 to 36-4 in the receiving apparatus 3. In this case, when acquiring feedback information from a remote apparatus, the communication apparatus receives the feedback information at one of the receiving units and passes it to the control unit. When transmitting feedback information to a remote apparatus, the communication apparatus transmits the feedback information, generated by the demodulation unit, to the remote apparatus via one of the transmitting units. Accordingly, the receiving unit 25 in the transmitting apparatus 2 and the transmitting unit 35 in the receiving apparatus 3 are omitted. When receiving or transmitting the feedback information, the communication apparatus uses only one antenna.

The demodulation unit 32 in the receiving apparatus 3 may select a plurality of combinations of the CQI value, rank value, and precoding vector. Then, the demodulation unit 32 may assign priorities to the plurality of combinations in descending order of the sum of the CQI values. The demodulation unit 32 may generate the feedback information by including therein the plurality of combinations of the CQI value, rank value, and precoding vector together with their corresponding priorities. In this case, in step S107 of the scheduling process illustrated in FIG. 2, the scheduling unit 27 in the transmitting apparatus 2 determines the precoding matrix based on the combination of the rank value and precoding vector having the highest priority. If any one of the transmitting units specified by the precoding matrix is faulty, the scheduling unit 27 in step S109 selects the next combination of the rank value and precoding vector in decreasing order of priority. Then, based on the thus selected combination, the scheduling unit 27 selects the precoding matrix that does not use the faulty transmitting unit. If the rank value actually used to select the precoding matrix is different from the rank value of the highest priority, the scheduling unit 27 corrects the number of streams for each codeword in accordance with the rank value actually used to select the precoding matrix. In this way, if any one of the transmitting units is faulty, the scheduling unit 27 can select the combination of transmitting units corresponding to the communication channels of good communication quality.

Next, a description will be given of a mobile station and a base station apparatus in a mobile communication system that employs the above communication system.

Figure 7:
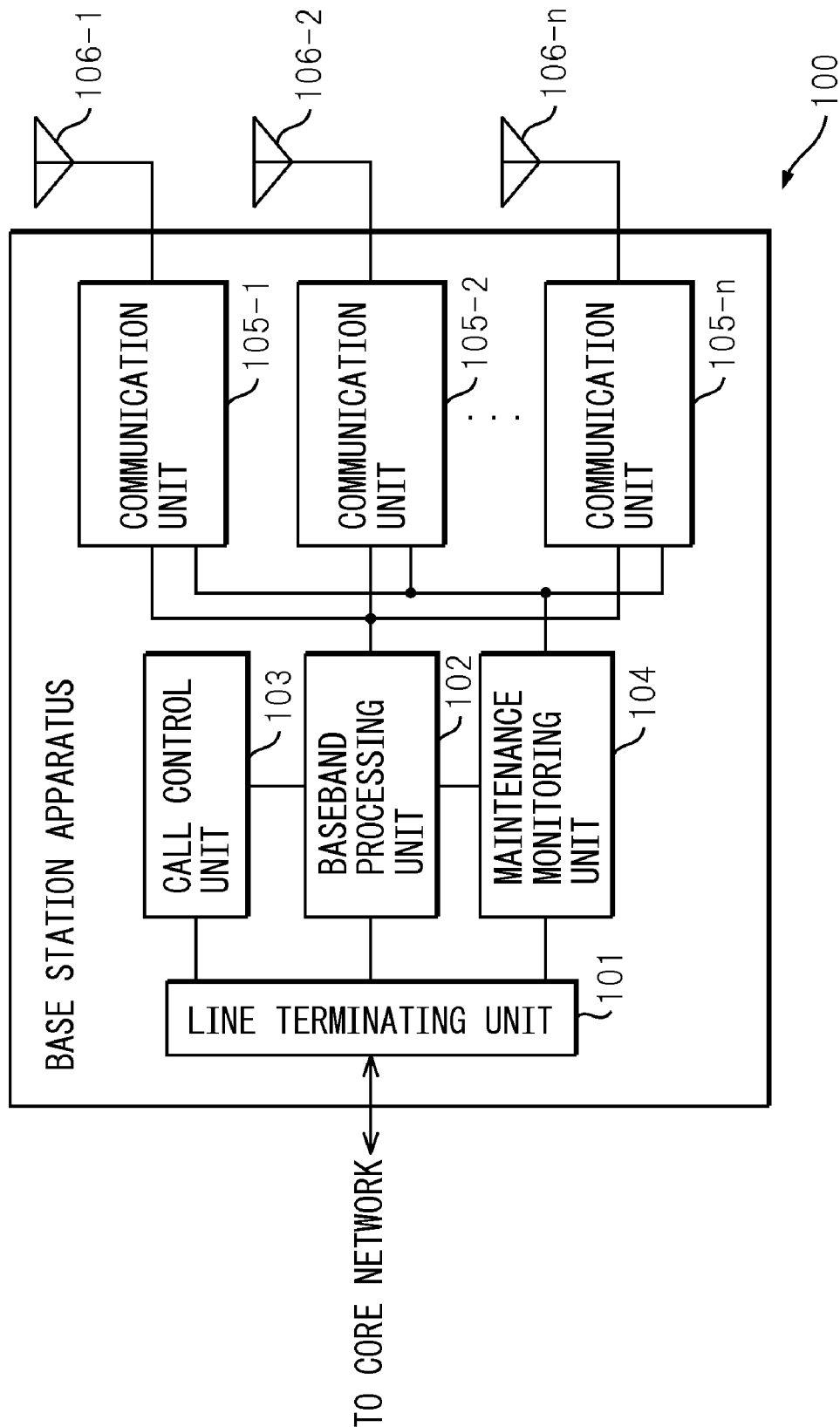
FIG. 7 is a diagram schematically illustrating the configuration of a base station apparatus in which the transmitting apparatus and receiving apparatus constituting the communication system according to the one embodiment are incorporated.

FIG. 7 is a diagram schematically illustrating the configuration of the base station apparatus in which the transmitting apparatus and receiving apparatus described above are incorporated. The base station apparatus 100 includes a line terminating unit 101, a baseband processing unit 102, a call control unit 103, a maintenance monitoring unit 104, and a plurality of communication units 105-1 to 105-n. Here, n is a natural number not smaller than 2. The baseband processing unit 102, the call control unit 103, the maintenance monitoring unit 104, and the communication units 105-1 to 105-n may be provided as separate circuits or may be implemented together on a single integrated circuit.

The line terminating unit 101 has a communication interface for connecting to a core network. The line terminating unit 101 terminates the core network to which a host apparatus is connected. The line terminating unit 101 receives from the core network a downlink signal to be transmitted to a mobile station, and passes the downlink signal to the baseband processing unit 102. On the other hand, an uplink signal received from the mobile station is passed via the baseband processing unit 102 to the line terminating unit 101, which outputs the uplink signal onto the network.

The baseband processing unit 102 includes the functions of the codeword generating unit 21, encoders 22-1 and 22-2, modulation unit 23, control unit 26, and scheduling unit 27 provided in the transmitting unit 2 of the above embodiment. The baseband processing unit 102 further includes the functions of the demodulation unit 32, decoders 33-1 and 33-2, and data combining unit 34 provided in the receiving apparatus 3 of the above embodiment.

The baseband processing unit 102 determines the number of streams, MOD, and TBS for each codeword and the precoding matrix, based on the feedback information received from the mobile station and on the transmitter operating state information received from the communication units 105-1 to 105-n. Further, the baseband processing unit 102 splits the downlink signal received from the core network into codewords each having a length defined by the transport block size TBS. The baseband processing unit 102 applies error correction coding to each codeword. The baseband processing unit 102 generates streams by splitting the encoded codeword in accordance with the above determined number of streams. Then, the baseband processing unit 102 quadrature-modulates the streams in accordance with the modulation mode MOD. The baseband processing unit 102 supplies each stream to a corresponding one of the communication units 105-1 to 105-n by referring to the precoding matrix.

The baseband processing unit 102 receives the uplink signal from the communication units 105-1 to 105-n, and demultiplexes from the uplink signal the streams transmitted out from the respective antennas of the mobile station. The baseband processing unit 102 then reconstructs the encoded codewords by combining the thus demultiplexed streams. The baseband processing unit 102 applies error correction decoding to the encoded codewords. The baseband processing unit 102 combines the decoded codewords to reconstruct the original uplink signal. Then, the baseband processing unit 102 outputs the uplink signal onto the core network via the line terminating unit 101.

Further, the baseband processing unit 102 calculates the feedback information, such as CQI value, rank value, and precoding vector, to be fed back to the mobile station, and transmits the feedback information to the mobile station via one of the communication units 105-1 to 105-n.

The call control unit 103 performs call control processing such as paging, call answering, call termination, etc., between the base station 100 and the mobile station such as a portable terminal communicating via the base station 100. Then, the call control unit 103 instructs the baseband processing unit 102 to start or terminate the operation, in accordance with the result of the call control processing.

The maintenance monitoring unit 104 monitors the operating states of the baseband processing unit 102 and the communication units 105-1 to 105-n. For this purpose, the maintenance monitoring unit 104 receives, from the baseband processing unit 102 and the communication units 105-1 to 105-n, the operating state signals indicating their operating states. If the occurrence of a fault in the baseband processing unit 102 or in any one of the communication units 105-1 to 105-n is detected based on the operating state signals, the maintenance monitoring unit 104 notifies the host apparatus of the occurrence of the fault by transmitting fault information via the line terminating unit 101.

The communication units 105-1 to 105-n each include one of the transmitting units provided in the transmitting apparatus 2 of the above embodiment and one of the receiving units provided in the receiving apparatus 3. The transmitting unit and receiving unit provided in each of the communication units 105-1 to 105-n are connected via a duplexer (not illustrated) to one of the antennas 106-1 to 106-n. The communication units 105-1 to 105-n amplify the downlink signal received from the baseband processing unit 102, and transmit out the amplified downlink signal via the antennas 106-1 to 106-n.

Further, the communication units 105-1 to 105-n receive via the antennas 106-1 to 106-n the uplink signal transmitted from the mobile station. Then, the communication units 105-1 to 105-n amplify the received unlink signal and pass it to the baseband processing unit 102. Each of the communication units 105-1 to 105-n supplies to the baseband processing unit 102 and the maintenance monitoring unit 104 the transmitter operating state information indicating whether the communication unit can transmit signals properly.

Each communication unit in the base station apparatus may be provided as an apparatus independent of the base station apparatus proper. In that case, each communication unit is connected to the base station apparatus proper, for example, by an optical fiber. Then, each communication unit and the base station apparatus proper communicate with each other in accordance with a predetermined standard such as Common Public Radio Interface (CPRI).

Figure 8:
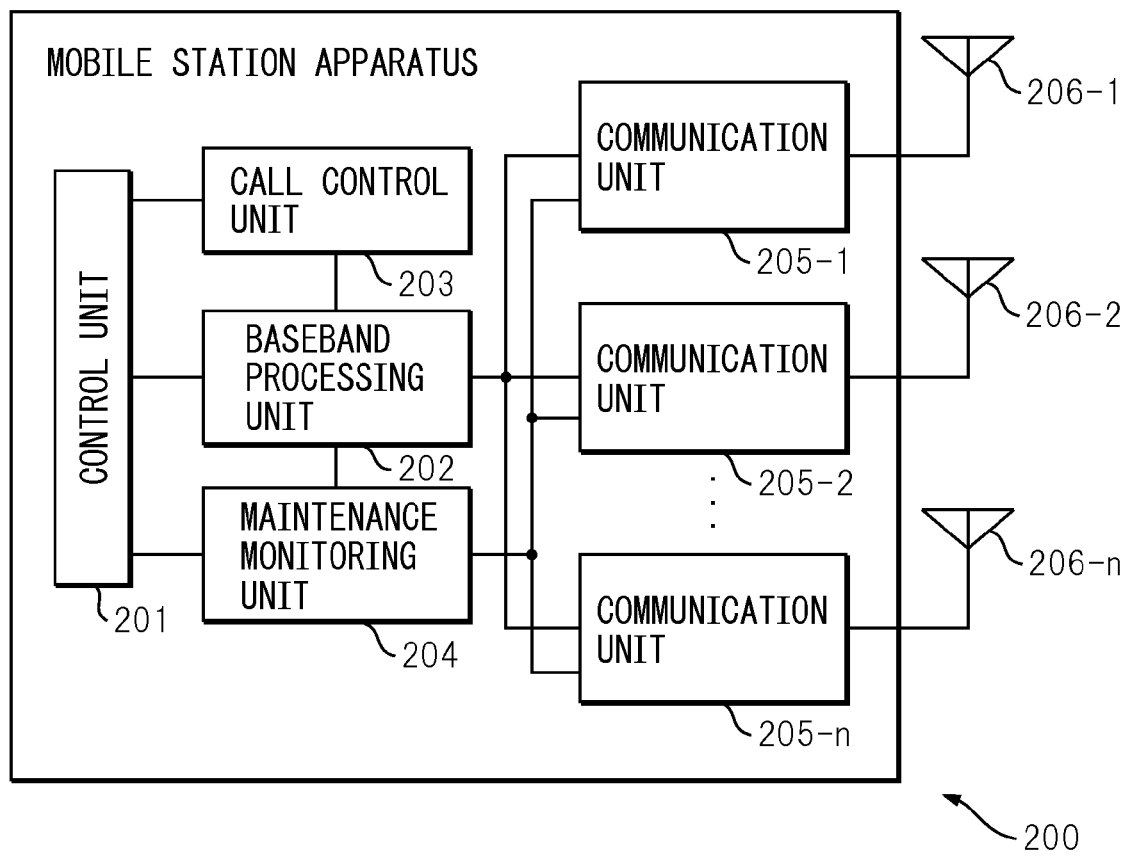
FIG. 8 is a diagram schematically illustrating the configuration of a mobile station apparatus in which the transmitting apparatus and receiving apparatus constituting the communication system according to the one embodiment are incorporated.

FIG. 8 is a diagram schematically illustrating the configuration of the mobile station apparatus in which the transmitting apparatus and receiving apparatus described above are incorporated. The mobile station apparatus 200 includes a control unit 201, a baseband processing unit 202, a call control unit 203, a maintenance monitoring unit 204, and a plurality of communication units 205-1 to 205-$n$. Here, n is a natural number not smaller than 2. The control unit 201, the baseband processing unit 202, the call control unit 203, the maintenance monitoring unit 204, and the communication units 205-1 to 205-$n$ may be provided as separate circuits or may be implemented together on a single integrated circuit.

The control unit 201 controls the entire operation of the mobile station apparatus 200. The control unit 201 executes various application programs that run on the mobile station apparatus 200. For this purpose, the control unit 201 includes a processor, a nonvolatile memory, and a volatile memory. When an application for performing communications such as voice or data communications is started up by a user operation via an operation unit (not illustrated) such as a keypad incorporated in the mobile station apparatus 200, the control unit 201 operates the call control unit 203 in accordance with the application. Then, the control unit 201 applies PCM coding or information source coding to the voice signal acquired via a microphone (not illustrated) incorporated in the mobile station apparatus 200 or the data requested for transmission by the application. The control unit 201 passes the thus processed signal as an uplink signal to the baseband processing unit 202. On the other hand, when a downlink signal is received from the baseband processing unit 202, the control unit 201 performs the reverse of the information source coding or PCM coding process and recovers the data or voice signal. The control unit 201 passes the voice signal to a speaker (not illustrated) incorporated in the mobile station apparatus 200. Or, the control unit 201 displays the acquired data on a display (not illustrated) incorporated in the mobile station apparatus 200.

The baseband processing unit 202 includes the functions of the codeword generating unit 21, encoders 22-1 and 22-2, modulation unit 23, control unit 26, and scheduling unit 27 provided in the transmitting unit 2 of the above embodiment. The baseband processing unit 202 further includes the functions of the demodulation unit 32, decoders 33-1 and 33-2, and data combining unit 34 provided in the receiving apparatus 3 of the above embodiment.

The baseband processing unit 202 determines the number of streams, MOD, and TBS for each codeword and the precoding matrix, based on the feedback information received from the base station and on the transmitter operating state information received from the communication units 205-1 to 205-$n$. Further, the baseband processing unit 202 splits the uplink signal into codewords each having a length defined by the transport block size TBS. The baseband processing unit 202 applies error correction coding to each codeword. The baseband processing unit 202 generates streams by splitting the encoded codeword in accordance with the above determined number of streams. Then, the baseband processing unit 202 quadrature-modulates the streams in accordance with the modulation mode MOD. The baseband processing unit 202 supplies each stream to a corresponding one of the communication units 205-1 to 205-$n$ by referring to the precoding matrix.

The baseband processing unit 202 receives the downlink signal from the communication units 205-1 to 205-$n$, and demultiplexes from the downlink signal the streams transmitted out from the respective antennas of the base station. The baseband processing unit 202 then reconstructs the encoded codewords by combining the thus demultiplexed streams. The baseband processing unit 202 applies error correction decoding to the encoded codewords. The baseband processing unit 202 combines the decoded codewords to reconstruct the original downlink signal. Then, the baseband processing unit 202 passes the downlink signal to the control unit 201.

Further, the baseband processing unit 202 calculates the feedback information, such as CQI value, rank value, and precoding vector, to be fed back to the base station, and transmits the feedback information to the base station via one of the communication units 205-1 to 205-$n$.

The call control unit 203 performs call control processing such as paging, call answering, call termination, etc., between the mobile station apparatus 200 and the base station apparatus. Then, the call control unit 203 instructs the baseband processing unit 202 to start or terminate the operation, in accordance with the result of the call control processing.

The maintenance monitoring unit 204 monitors the operating states of the baseband processing unit 202 and the communication units 205-1 to 205-$n$. For this purpose, the maintenance monitoring unit 204 receives, from the baseband processing unit 202 and the communication units 205-1 to 205-$n$, the operating state signals indicating their operating states. If the occurrence of a fault in the baseband processing unit 202 or in any one of the communication units 205-1 to 205-$n$ is detected based on the operating state signals, the maintenance monitoring unit 204 outputs fault information to notify the control unit 201 of the occurrence of the fault.

The communication units 205-1 to 205-$n$ each include one of the transmitting units provided in the transmitting apparatus 2 of the above embodiment and one of the receiving units provided in the receiving apparatus 3. The transmitting unit and receiving unit provided in each of the communication units 205-1 to 205-$n$ are connected via a duplexer (not illustrated) to one of the antennas 206-1 to 206-$n$. The communication units 205-1 to 205-$n$ amplify the uplink signal received from the baseband processing unit 202, and transmit out the amplified uplink signal via the antennas 206-1 to 206-$n$.

Further, the communication units 205-1 to 205-$n$ receive via the antennas 206-1 to 206-$n$ the downlink signal transmitted from the base station. Then, the communication units 205-1 to 205-$n$ amplify the received downlink signal and pass it to the baseband processing unit 202. Each of the communication units 205-1 to 205-$n$ supplies to the baseband processing unit 202 and the maintenance monitoring unit 204 the transmitter operating state information indicating whether the communication unit can transmit signals properly.

The mobile station apparatus 200 may further include an interface unit for connecting the mobile station apparatus 200 to another apparatus via a data transmission link such as a Peripheral Component Interconnect (PCI) bus or a Universal Serial Bus (USB). In that case, the interface unit is connected to the control unit 201, and outputs signals received from the control unit 201 onto the data transmission link for transmission to that other apparatus. On the other hand, when a signal is received from that other apparatus via the data transmission link, the interface unit passes the signal to the control unit 201.

All of the examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
    a plurality of transmitting units, each of which is connected to a different antenna and transmits a signal stream via the antenna;
    a scheduling unit which is configured such that when a number of receiving units capable of simultaneously receiving, the number being included in feedback information received from a receiving apparatus having a plurality of receiving units respectively connected to different antennas, is larger than a number of transmitting units detected from among the plurality of transmitting units as being capable of transmitting, a number of outputs indicating the number of transmitting units to be used to transmit signal streams is set so as not to exceed the number of transmitting units capable of transmitting, and a combination of transmitting units corresponding to the number of outputs, to each of which one of the signal streams is to be input, is defined in the form of a precoding matrix;
    a codeword generating unit that generates, from data to be transmitted, a predetermined number of codewords to be transmitted out simultaneously;
    an encoder that encodes the predetermined number of codewords, and generates signal streams corresponding to the number of outputs by splitting the encoded codewords; and
    a modulation unit that supplies each of the signal streams generated by the encoder to a corresponding one of the transmitting units in accordance with the precoding matrix.

2. The communication apparatus according to claim 1, wherein the feedback information includes matrix specifying information for specifying the precoding matrix, and wherein
    the scheduling unit is configured such that:
    when the number of receiving units capable of simultaneously receiving, the number being included in the feedback information, is not larger than the number of transmitting units detected from among the plurality of transmitting units as being capable of transmitting, if all of the transmitting units to which the signal streams are to be input in accordance with the precoding matrix specified by the matrix specifying information are capable of transmitting, the precoding matrix specified by the matrix specifying information is selected for use, but
    if any one of the transmitting units to which the signal streams are to be input in accordance with the precoding matrix specified by the matrix specifying information is not capable of transmitting, a combination of transmitting units corresponding to the number of outputs excluding any transmitting unit not capable of transmitting is selected for use as the precoding matrix.

3. The communication apparatus according to claim 2, wherein the feedback information includes a plurality of pieces of the matrix specifying information and priority assigned to each piece of the matrix specifying information, and wherein
    the scheduling unit is configured such that:
    if the number of receiving units capable of simultaneously receiving, the number being included in the feedback information, is not larger than the number of transmitting units detected from among the plurality of transmitting units as being capable of transmitting, and if all of the transmitting units to which the signal streams are to be input in accordance with the precoding matrix specified by first matrix specifying information having the highest priority are capable of transmitting, the precoding matrix specified by the first matrix specifying information is selected for use, but
    if any one of the transmitting units to which the signal streams are to be input in accordance with the precoding matrix specified by the first matrix specifying information is not capable of transmitting, or if the number of receiving units capable of simultaneously receiving, the number being included in the feedback information, is larger than the number of transmitting units detected from among the plurality of transmitting units as being capable of transmitting, the precoding matrix is determined in accordance with matrix specifying information having the highest priority among other matrix specifying information specifying a combination of transmitting units excluding any transmitting unit not capable of transmitting.

4. A communication method for use in a communication apparatus having a plurality of transmitting units respectively connected to different antennas, the method comprising:
    receiving, from each of the plurality of transmitting units, transmitter operating state information indicating the operating state of the each transmitting unit;
    receiving feedback information from a receiving apparatus having a plurality of receiving units respectively connected to different antennas, the feedback information including the number of receiving units capable of simultaneously receiving;
    if the number of receiving units capable of simultaneously receiving is larger than the number of transmitting units capable of transmitting that is obtained based on the transmitter operating state information, then setting a number of outputs indicating the number of transmitting units to be used to transmit signal streams so that the number of outputs does not to exceed the number of transmitting units capable of transmitting;
    defining, in the form of a precoding matrix, a combination of transmitting units corresponding to the number of outputs to each of which one of the signal streams is to be input;
    generating, from data to be transmitted, a predetermined number of codewords to be transmitted out simultaneously;
    encoding the predetermined number of codewords, and generating signal streams corresponding to the number of outputs by splitting the encoded codewords; and
    supplying each of the generated signal streams to a corresponding one of the transmitting units in accordance with the precoding matrix.

5. A mobile station apparatus comprising:
    a baseband processing unit that encodes an uplink signal; and
    a plurality of communication units, respectively connected to different antennas, that transmit the uplink signal encoded by the baseband processing unit to a base station apparatus having a plurality of receiving units respectively connected to different antennas, and wherein the baseband processing unit includes:

a scheduling unit which is configured such that when the number of receiving units capable of simultaneously receiving, the number being included in feedback information received from the base station apparatus, is larger than a number of communication units detected from among the plurality of communication units as being capable of transmitting, a number of outputs indicating the number of communication units to be used to transmit signal streams is set so as not to exceed the number of communication units capable of transmitting, and a combination of communication units corresponding to the number of outputs, to each of which one of the signal streams is to be input, is defined in the form of a precoding matrix;

a codeword generating unit that generates, from the uplink signal, a predetermined number of codewords to be transmitted out simultaneously;

an encoder that encodes the predetermined number of codewords, and generates signal streams corresponding to the number of outputs by splitting the encoded codewords; and a modulation unit that supplies each of the signal streams generated by the encoder to a corresponding one of the communication units in accordance with the precoding matrix.

* * * * *